United States Patent Office 3,517,511
Patented June 30, 1970

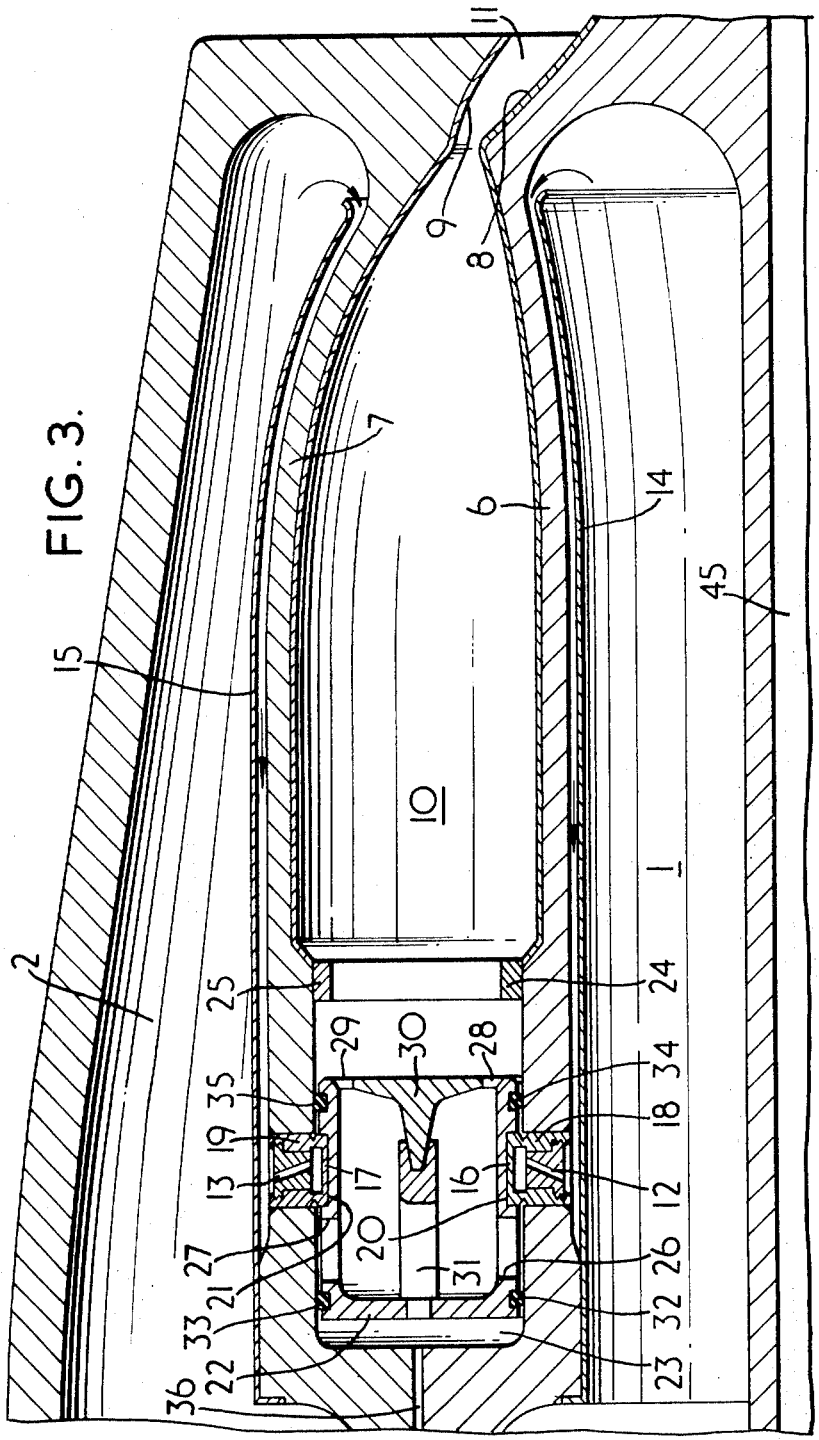
INVENTORS:-
EDWARD GEORGE DAVID ANDREWS &
HARRY OLDFIELD

3,517,511
BI-PROPELLANT ROCKET ENGINE
Edward George David Andrews, Cawston, near Rugby, and Harry Oldfield, Coventry, England, assignors to Rolls-Royce Limited, Derby, England, a British company
Filed Dec. 5, 1968, Ser. No. 781,478
Claims priority, application Great Britain, Dec. 9, 1967, 56,079
Int. Cl. F02k 9/02
U.S. Cl. 60—259
10 Claims

ABSTRACT OF THE DISCLOSURE

A bi-propellant rocket engine including a pair of coaxial annular tanks in which the propellants are stored separately of each other, each of the tanks communicating during operation of the engine, with a combustion chamber defined between a portion of the outer peripheral wall of the inner tank and a corresponding portion of the inner peripheral wall of the outer tank spaced apart radially and also shaped to define an annular propulsive nozzle communicating with the combustion chamber.

---

The invention relates to a bi-propellant rocket engine and is particularly concerned with a rocket engine in which each propellant is contained in a tank which is kept sealed until immediately before firing.

The invention is concerned with a compact arrangement of the two propellant tanks.

According to the invention, a bi-propellant rocket engine comprises a combustion chamber and a pair of tanks in which the propellants are stored separately of each other, each of the tanks being arranged to communicate, during operation of the engine, with the combustion chamber and positioned coaxially one within the other, a portion of the outer peripheral wall of the inner tank and a corresponding portion of the inner peripheral wall of the outer tank being spaced apart radially and shaped to define therebetween an annular propulsive nozzle communicating with the combustion chamber.

Further portions of the outer peripheral wall of the inner tank and the inner peripheral wall of the outer tank upstream of the nozzle-defining portions may also be spaced apart radially and shaped to define the combustion chamber. The latter may be annular or be formed as a plurality of cylindrical chambers spaced apart circumferentially of the coaxial tanks.

The radially inner tank may be cylindrical or annular. Where it is annular, another rocket engine combustion chamber and a propulsive nozzle communicating therewith may be arranged coaxially within the inner annular tank, the inner combustion chamber having its own propellant supply independent of the propellants in the annular tanks. The inner combustion chamber and nozzle may provide a main or sustainer thrust, the outer annular propulsive nozzle being used for providing boost.

The outer peripheral wall of the inner tank and the inner peripheral wall of the outer tank may each be provided with an initially sealed port leading to the combustion chamber, the rocket engine also including means operable to open each port when the engine is to be fired. The port-opening means is preferably a piston slidable axially of the combustion chamber into a position in which it has sheared through the seals of the ports. The piston may conveniently be moved by a fluid under pressure which is also applied to the tanks to pressurise the propellants therein.

By way of example, a rocket engine in accordance with the invention is described with reference to the accompanying drawings, in which:

FIG. 3 is a part of FIG. 1 drawn to a larger scale and showing more detail;

Figure 1:
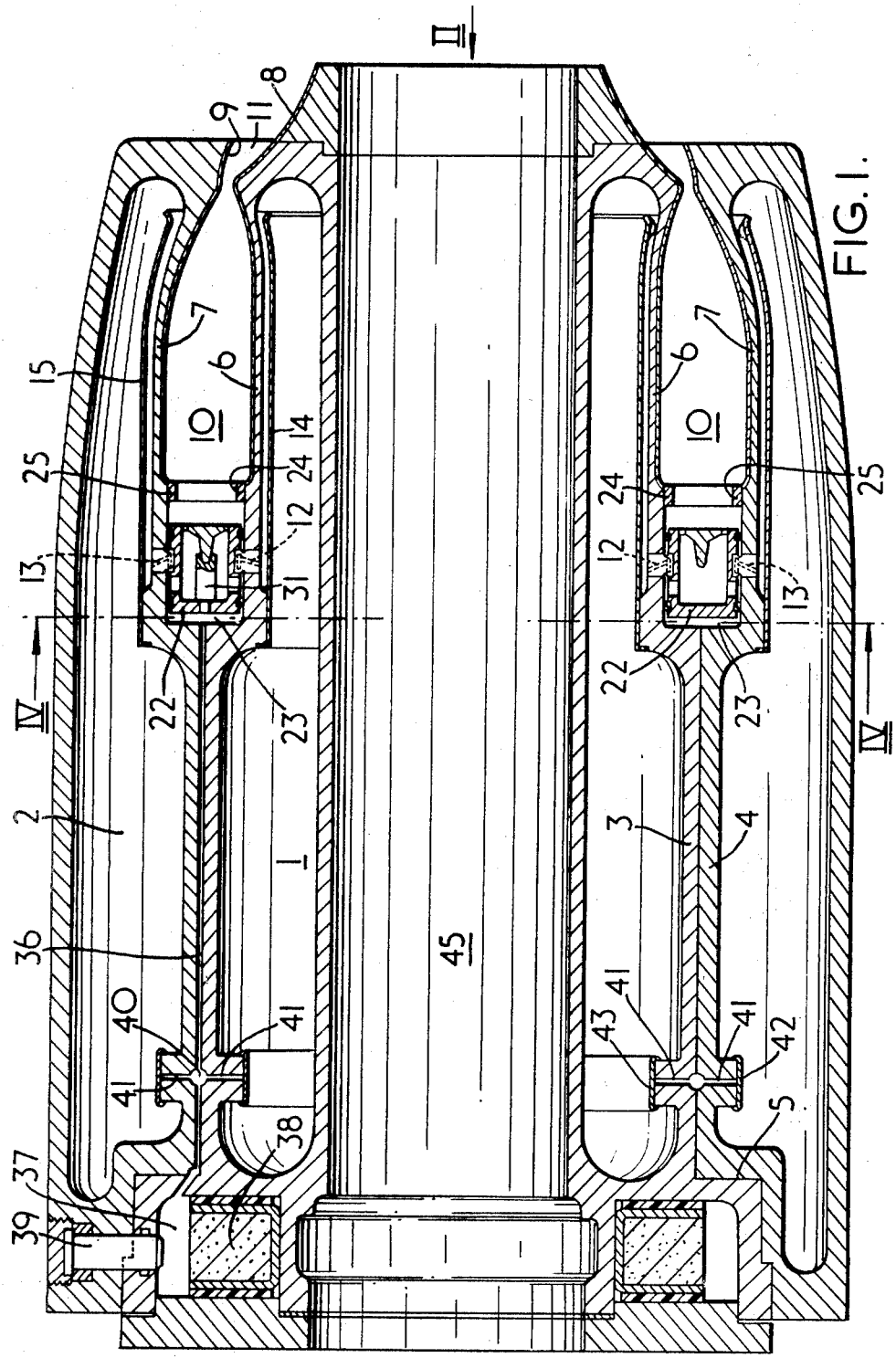
FIG. 1 is an axial section through the engine.
Figure 2:
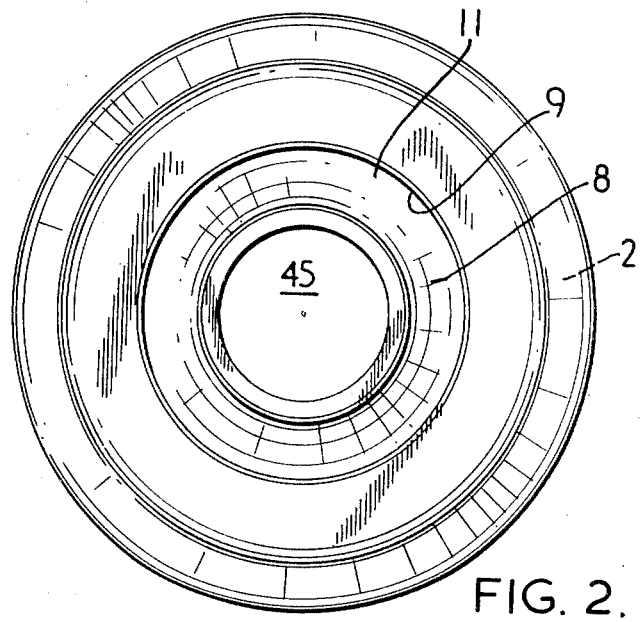
FIG. 2 is an end view to a smaller scale in the direction of arrow II in FIG. 1.
Figure 4:
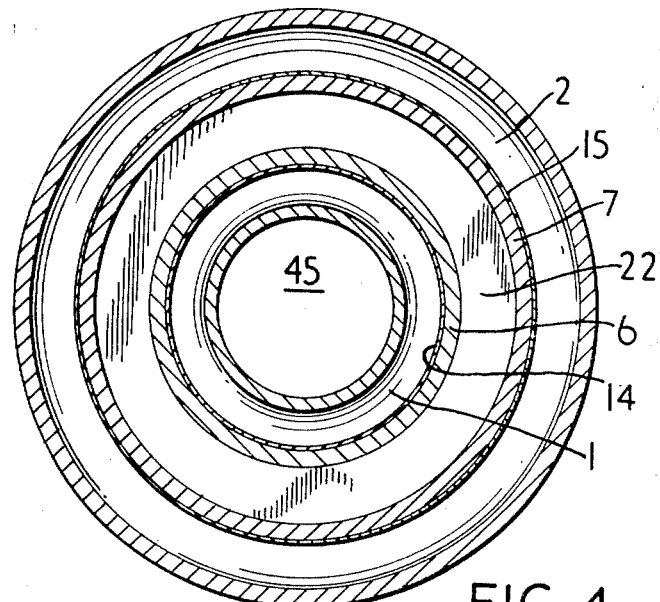
FIG. 4 is a section to a smaller scale on the line IV—IV in FIG. 1.

The engine shown in FIGS. 1 to 4 comprises an annular tank 1 and, positioned coaxially around it, another annular tank 2. Adjacent upstream portions 3 and 4 of the cylindrical walls of the two tanks are telescopically slidable relatively to each other until a pair of annular end faces 5 on the respective tanks have abutted as shown in FIG. 1. The tanks each contain a different propellant, the outer tank 2, having the larger volume, contains oxidant and the inner tank 1 contains fuel; but for some bi-propellants the outer tank could contain fuel and the inner tank could contain oxidant.

Axially forward portions 6, 7 and 8, 9 of the adjacent peripheral walls of the annular tanks 1 and 2 are spaced apart radially to define therebetween an annular combustion chamber 10 and an annular nozzle 11. The wall portions 6 and 7 contain ports 12 and 13 leading from the tanks 1 and 2 respectively into the combustion chamber 10. The ports are shielded by annular baffles 14 and 15 which ensure that the propellants will flow from the downstream ends of the tanks 1 and 2 through annular spaces between the respective baffles 14 and 15 and the walls 6 and 7 to the ports 12 and 13. The ports 12 and 13 are kept closed until immediately prior to firing, when seals closing them are opened (as hereinafter described) to permit the propellants to flow under pressure from the tanks into the combustion chamber 10. The pressure for effecting the flow of the propellants is produced by a pressurising gas which is admitted to the tanks just prior to the opening of the ports 12 and 13.

The tanks are manufactured and filled with propellant separately of each other and are assembled to form the engine by sliding them relatively of each other, the pairs of wall portions 3 and 4 sliding telescopically until the shoulders 5 have abutted. The separate manufacture of the tanks 1 and 2 and the telescopic assembly of the engine enables the walls 6, 7, 8 and 9 bounding the combustion chamber 10 and the nozzle 11 to be sprayed with heat resistant material and inspected before assembly of the engine.

The annular nozzle 11 may be provided with circumferentially-spaced vanes (not shown) carried by one or other of the walls 8 and 9 to effect a desired circumferential component of swirl to the gases passing through the nozzle or to straighten the gas flow.

The means for opening the propellant jets 12 and 13 is shown in FIG. 3. The jets are initially closed by end caps 16 and 17 integral with tubular sleeves 18 and 19 respectively in which the jets 12 and 13 are positioned. The end caps 16 and 17 are positioned in annular recesses 20, 21 in the peripheral walls of an annular piston 22 slidable in an annular chamber 23 defined by the walls of the propellant tanks 1 and 2 immediately upstream of the combustion chamber 10. The annular piston 22 is slidable from the position illustrated in FIG. 3 into an operative position in which the downstream end of the piston 22 has engaged a pair of annular stops 24, 25 carried by the respective tanks 1 and 2 at the upstream end of the combustion chamber 10. In moving from the illustrated position into its operative position, the upstream end faces defining the recesses 20, 21 will shear the end caps 16 and 17 from the sleeves 18 and 19 and the end caps will be carried in the recesses with the piston, thereby opening the jets 12 and 13. When the piston 22 has reached its operative position, ports 26, 27 in the peripheral walls of the piston 22 will register with the respective ports 12, 13 and the propellants in the tanks 1 and 2 will flow into the interior of the piston 22, which will thereby form a premixing chamber. The latter has a pair of annular ports 28, 29 formed between the inner periphery of the piston 22 and an annular baffle 30 supported by pegs 31 from the piston 22. The mixed propellants then enter the combustion chamber 10 and after reaction propulsive gases pass through the annular nozzle 11 to provide thrust.

The piston 22 carries sealing O-rings 32, 33, 34, 35 and is moved from the illustrated position to its operative position by a pressurising gas introduced into the annular chamber 23 through a passage 36 formed between the walls 3 and 4 and leading from a chamber 37 containing a solid propellant charge 38 to be fired by an igniter 39. The passage 36 also communicates through an annular gallery 40 and radial passages 41 extending therefrom in the walls 3 and 4 to annular burst rings 42, 43 sealing the passages 41 from the interiors of the tanks 1 and 2. When the charge 38 is fired, pressurising gas therefrom flows through the passage 36 to the passages 41 and the burst rings 42, 43 are ruptured. The pressurising gas effects direct pressurising of the propellants in the tanks 1 and 2. The pressurising gas also enters the chamber 23 and effects operation of the piston 22 and opening of the jets 12 and 13 as already described. As the propellants in the tanks 1 and 2 are pressurised, they will flow through the opened jets 12, 13 and the ports 26, 27 into the interior of the piston and the combustion chamber.

Figure 5:
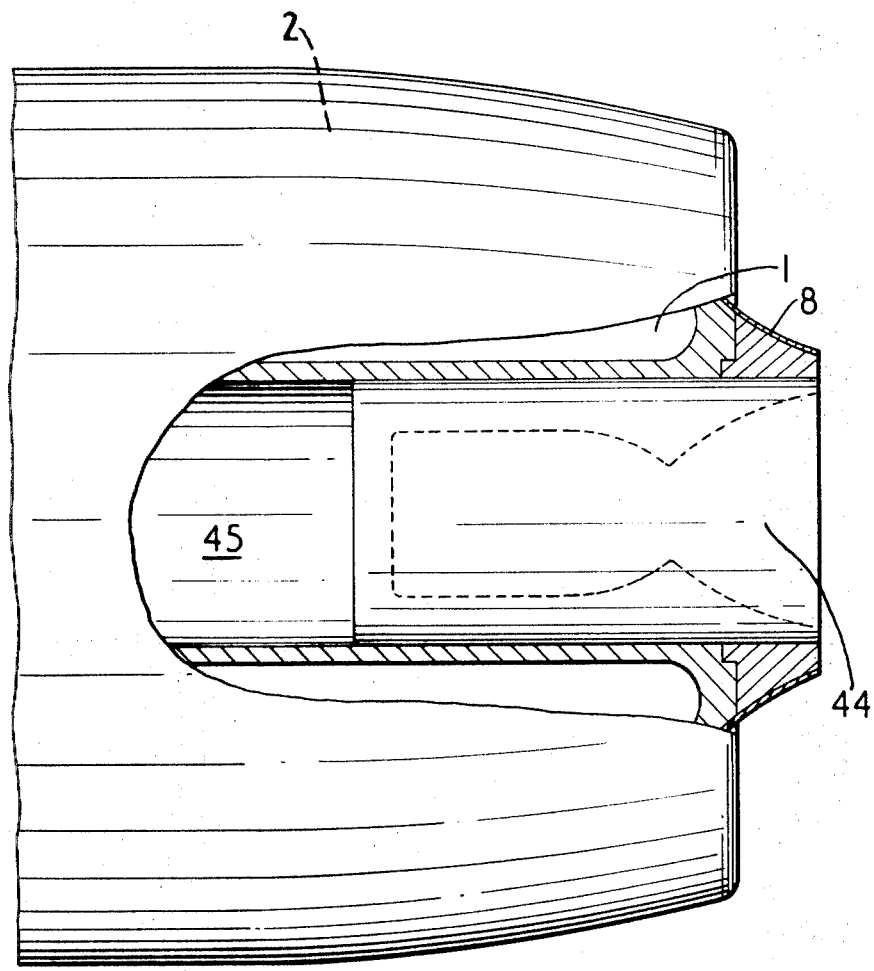
FIG. 5 is a partial side view and partial axial section of the downstream end of the engine, the latter also including a combustion chamber of another rocket engine positioned coaxially therewithin.

The combustion chamber 10 and the annular nozzle 11 could be used to provide the main propulsive thrust on a vehicle in which the engine is carried. Alternatively, the central space within the annular tank 1 may contain a further combustion chamber and integral nozzle of a conventional kind 44 (see FIG. 5) supplied with its propellant or propellants through a central passage 45 defined by the radially inner peripheral wall of the tank 1 or from a tank or tanks positioned within the passage 45. The combustion chamber and nozzle 44 would be used to provide the main or sustaining propulsive thrust and the combustion chamber 10 and the annular nozzle 11 would be used to provide a boost thrust.

Instead of the annular combustion chamber 10 several circumferentially-spaced cylindrical chambers may be formed between the wall portions 6 and 7.

Locking means (not shown) are provided to hold the end faces 5 of the tanks 1 and 2 from axial separation after they have been fitted together as shown in FIG. 1.

What we claim as our invention and desire to secure by Letters Patent of the United States is:

1. A bi-propellant rocket engine comprising a combustion chamber and a pair of tanks in which the propellants are stored separately of each other, each of the tanks being arranged to communicate, during operation of the engine, with the combustion chamber, wherein the improvement comprises the tanks are positioned coaxially one within the other, a portion of the outer peripheral wall of the inner tank and a corresponding portion of the inner peripheral wall of the outer tank being spaced apart radially and shaped to define therebetween an annular propulsive nozzle communicating with the combustion chamber.

2. A rocket engine as claimed in claim 1 in which further portions of the outer peripheral wall of the inner tank and the inner peripheral wall of the outer tank upstream of the nozzle-defining portions are also spaced apart radially and shaped to define the combustion chamber.

3. A rocket engine as claimed in claim 2 in which the combustion chamber is annular.

4. A rocket engine as claimed in claim 1 in which the radially inner tank is annular.

5. A rocket engine as claimed in claim 1 in which the radially inner one of the two tanks contains fuel and the radially outer tank contains an oxidant.

6. A rocket engine as claimed in claim 1 in which the outer peripheral wall of the inner tank and the inner peripheral wall of the outer tank are each provided with an initially sealed port leading to the combustion chamber, the rocket engine also including means operable to open each port when the engine is to be fired.

7. A rocket engine as claimed in claim 6 in which the port-opening means is a piston slidable coaxially of the combustion chamber into a position in which it has sheared through the seals of the ports.

8. A rocket engine as claimed in claim 7 in which said piston is movable by a fluid under pressure, said fluid also being supplied to the tanks to pressurise the propellants therein.

9. A rocket engine as claimed in claim 4 in which another rocket engine combustion chamber and a propulsive nozzle communicating therewith are arranged coaxially within the inner annular tank, the inner combustion chamber having its own propulsive supply independent of the propellants in the annular tanks.

10. A rocket engine as claimed in claim 9 in which the inner combustion chamber and nozzle provides a main or sustainer thrust, the outer annular propulsive nozzle being used for providing a boost thrust.

References Cited

UNITED STATES PATENTS

| | | | |
|---|---|---|---|
| 2,972,225 | 2/1961 | Cumming | 60—259 |
| 3,094,837 | 6/1963 | Sherman | 60—259 |
| 3,145,530 | 8/1964 | Sobey | 60—225 |
| 3,182,593 | 5/1965 | Seidner | 60—225 |
| 3,214,906 | 11/1965 | Coleal | 60—39.48 |
| 3,312,068 | 4/1967 | Sutor | 60—271 |

CARLTON R. CROYLE, Primary Examiner

D. HART, Assistant Examiner

U.S. Cl. X.R.

60—39.48, 263, 271